(12) United States Patent
Akpom

(10) Patent No.: US 7,077,405 B2
(45) Date of Patent: Jul. 18, 2006

(54) STROLLER WITH CD PLAYER

(76) Inventor: Stacie Akpom, 2321 Overland La., Arlington, TX (US) 76014

( * ) Notice: Subject to any disclaimer, the term of this patent is extended or adjusted under 35 U.S.C. 154(b) by 242 days.

(21) Appl. No.: 10/751,639

(22) Filed: Jan. 6, 2004

(65) Prior Publication Data

US 2004/0140699 A1    Jul. 22, 2004

Related U.S. Application Data

(60) Provisional application No. 60/440,619, filed on Jan. 17, 2003.

(51) Int. Cl.
*B62B 9/26* (2006.01)
(52) U.S. Cl. ............... 280/47.38; 297/217.4; 381/302
(58) Field of Classification Search ............ 280/47.34, 280/47.38, 47.4; 297/217.4, 217.5; 381/86, 381/333, 301, 302
See application file for complete search history.

(56) References Cited

U.S. PATENT DOCUMENTS

| | | | |
|---|---|---|---|
| 4,979,777 A * | 12/1990 | Takada | .................... 297/250.1 |
| 5,143,055 A | 9/1992 | Eakin | |
| 5,147,109 A | 9/1992 | Jolly | |
| 5,482,352 A | 1/1996 | Leal et al. | |
| 5,491,756 A | 2/1996 | Francais | |
| 5,624,156 A | 4/1997 | Leal et al. | |
| 5,838,808 A * | 11/1998 | Prosser | ...................... 381/388 |
| 5,887,071 A * | 3/1999 | House | ...................... 381/386 |
| 5,938,216 A | 8/1999 | Weng | |
| 6,027,137 A | 2/2000 | Rura | |
| 6,089,663 A * | 7/2000 | Hill | ........................ 297/258.1 |
| 6,135,551 A * | 10/2000 | Linder | .................... 297/217.4 |
| 6,409,206 B1 | 6/2002 | Willrich | |
| 6,623,072 B1 * | 9/2003 | Mellace | .................... 297/16.1 |
| 6,744,898 B1 * | 6/2004 | Hirano | ...................... 381/333 |
| 6,764,133 B1 * | 7/2004 | Osato | .................... 297/217.4 |
| 2002/0140260 A1 | 10/2002 | Osato | |

* cited by examiner

*Primary Examiner*—Jeff Restifo
(74) *Attorney, Agent, or Firm*—Richard C. Litman

(57) ABSTRACT

An audio system which system is incorporated in a child's stroller. The system includes speakers permanently enclosed in the sidewalls or canopy of the stroller. Protective padding is provided for the speakers to prevent damage thereto and to dampen the sound to afford protection to the child's hearing. A pocket is provided in the rear of the stroller whereby to house an audio player such as a CD player. Appropriate jacks are provided to connect the CD player to the speakers.

3 Claims, 3 Drawing Sheets

STROLLER WITH CD PLAYER

CROSS-REFERENCE TO RELATED APPLICATION

This application claims the benefit of U.S. Provisional Patent Application Ser. No. 60/440,619, filed Jan. 17, 2003.

BACKGROUND OF THE INVENTION

1. Field of the Invention

The present invention generally relates to apparatus for infants. More specifically, the present invention is drawn to an accessory for a stroller.

2. Description of the Related Art

Any mother can attest to the fact that an infant or toddler's attention span is very brief. Many attempts have been made to find suitable ways to keep the child focused and content for extended periods. One way to accomplish the above-stated goal has been to take the child for outings in the well-known stroller. Alas, however, even the constant motion of a stroller ride and the changing outdoor scenery is not enough to keep the little one from becoming fretful and unhappy. It would certainly be advantageous if the tot could listen to a favorite song or hear a soothing voice during the stroller ride to allay the fretfulness and restore happiness.

The related art is replete with audio devices for piping sound to speakers attached to a stroller. For example, U.S. Pat. No. 5,624,156 (Leal et al.) and U.S. Patent Application Publication 2002/0140260 A1 (Osato) disclose strollers having audio systems attached thereto. Note that the above cited apparatus does not incorporate padding for the speakers.

U.S. Pat. No. 5,938,216 (Weng) shows a carriage equipped with a sound and illumination system. There is no provision for including speakers on the carriage.

U.S. Pat. No. 5,147,109 (Jolly) and U.S. Pat. No. 5,482,352 (Leal et al.) are drawn to children's car seats having audio equipment attached thereto. There is no contemplation for incorporating padded speakers in the seats.

U.S. Pat. No. 5,143,055 (Eakin) shows a somatic chair having means to produce both audible and tactile sensations. The chair is adapted for use by adults and is attached to a fixed base.

U.S. Pat. No. 6,027,137 (Rura) and U.S. Pat. No. 6,409,206 B1 (Willrich) are drawn to apparatus for cooling a stroller. No audio devices are incorporated in the strollers.

U.S. Pat. No. 5,491,756 (Francais) discloses a system for generating sound to fetus. The system is adapted to be worn about the abdomen area of the expectant mother.

None of the above inventions and patents, taken either singularly or in combination, is seen to disclose a stroller having padded speakers as will subsequently be described and claimed in the instant invention.

SUMMARY OF THE INVENTION

The present invention is directed to an audio system, which system is incorporated in a child's stroller. The system includes speakers permanently enclosed in the back wall or canopy of the stroller. Protective padding is provided for the speakers to prevent damage thereto and to dampen the sound to afford protection to the child's hearing. A pocket is provided in the rear of the stroller in which to house an audio component such as a CD player. Appropriate jacks are provided to connect the CD player to the speakers. The pocket is large enough to contain plural CD discs.

Accordingly, it is a principal object of the invention to provide an entertainment system for use on a child's stroller.

It is another object of the invention to provide an entertainment system for a stroller, which system is an audio system.

It is a further object of the invention to provide an entertainment system for a stroller, which system incorporates padded speakers mounted in the canopy of the stroller.

Still another object of the invention is to provide an entertainment system for a stroller including a housing disposed at the rear of the stroller for containing an audio component.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
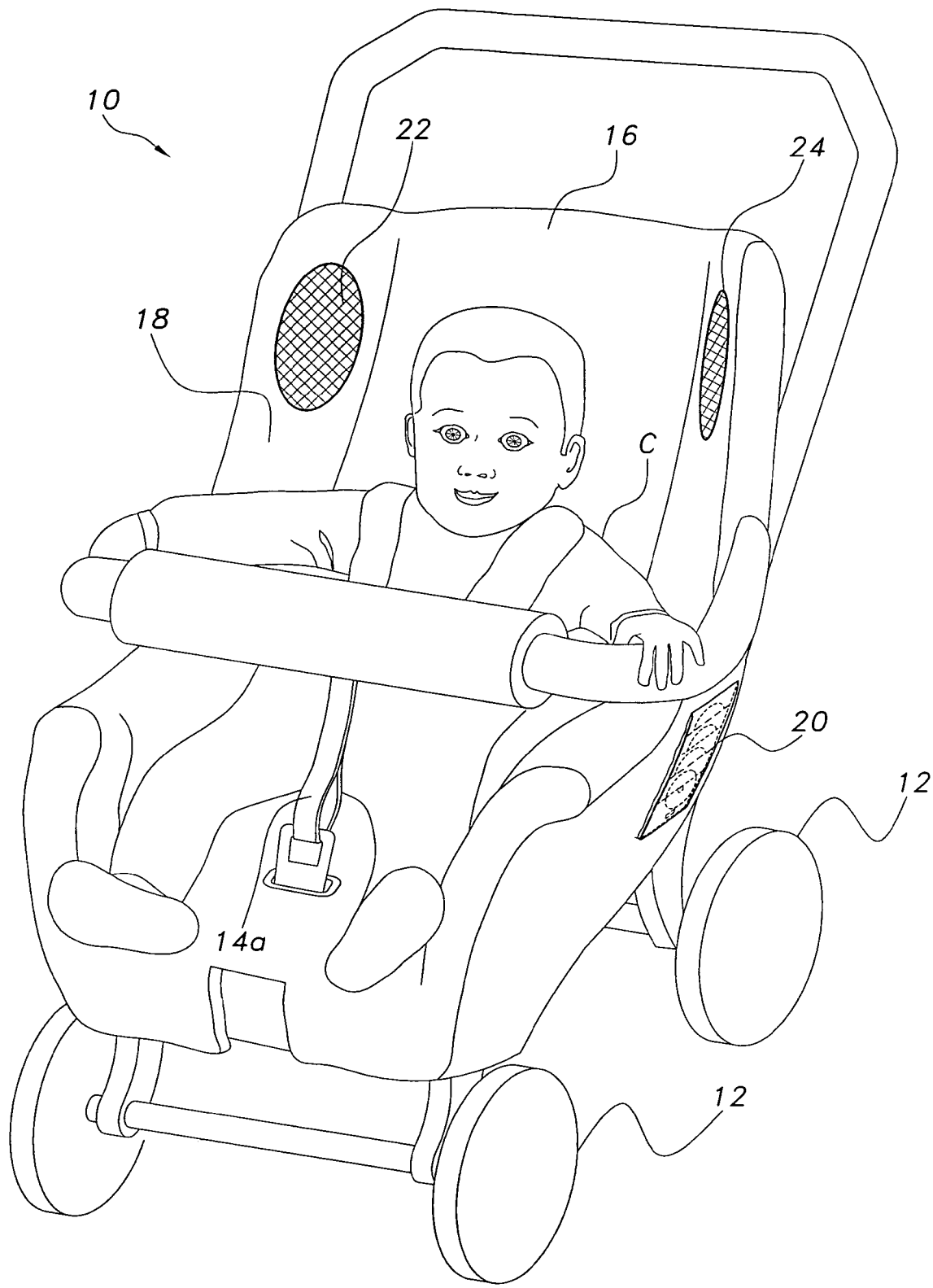
FIG. 1 is an environmental, perspective view of a stroller with CD player according to the present invention.
Figure 3:
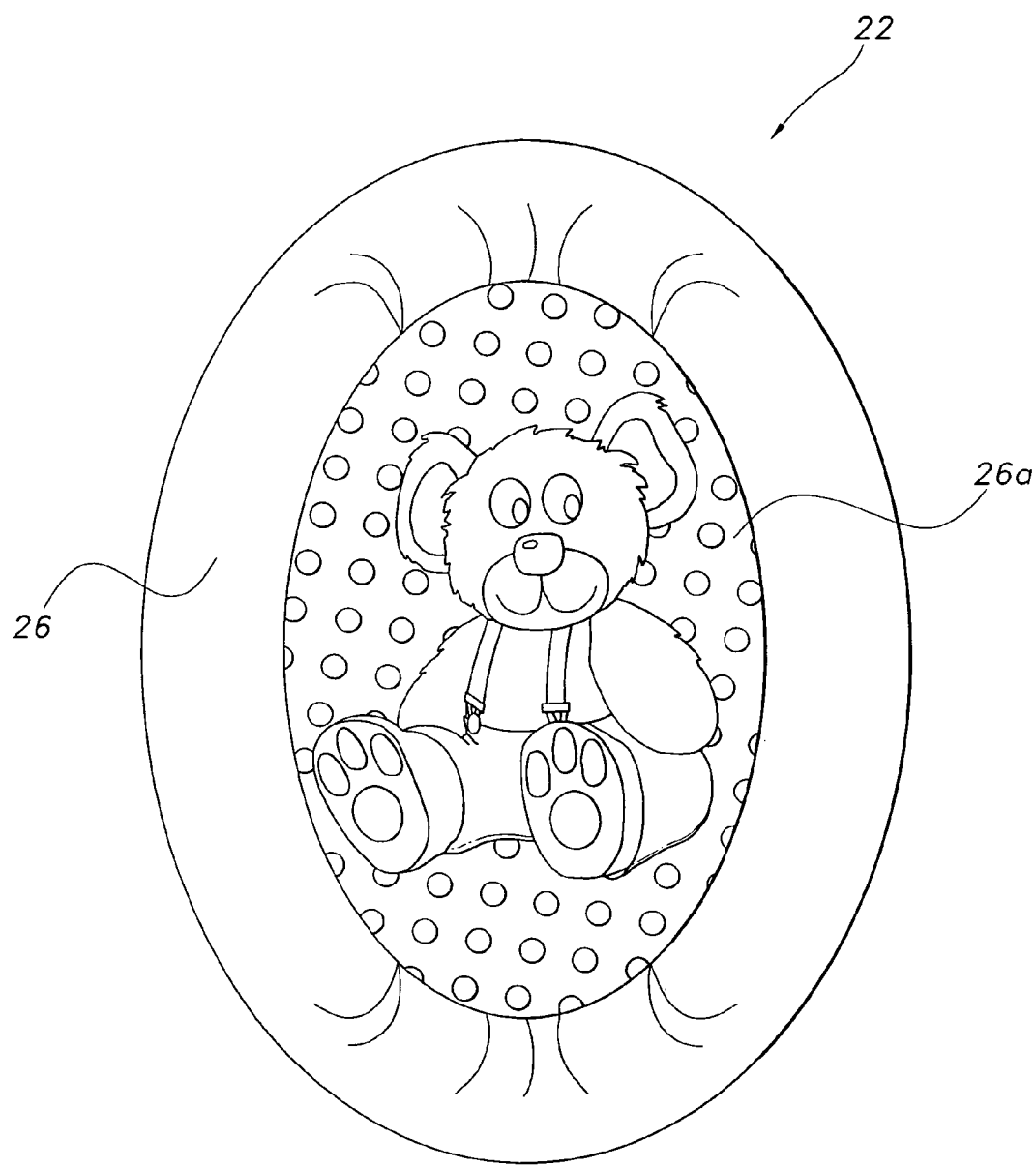
FIG. 3 is a front view of a padded speaker according to the present invention.

Attention is first directed to FIG. 1 of the drawings wherein a stroller incorporating an audio system is generally indicated at 10. The stroller includes conventional wheels 12. Safety bar and strap 14a are employed to hold a child C securely in the stroller seat. The stroller is provided with a back wall or canopy 16 having side wall areas 18. A pair of waterproof, rain-resistant audio speakers 22, 24 are disposed in the sidewall areas above the child's head. Rain-resistant CD holders 20 (only one is shown) are removably disposed on the sides of the stroller. As best seen in FIG. 3, each speaker is heavily padded with a soft, durable, supple material 26 such as polyurethane or the like. The padding is provided with a perforated surface 26a which may be decorated with a child-pleasing design. The heavy padding 26 serves a twofold purpose. First, the padding guards the speakers from the inquisitive and active fingers of the child. More importantly, the padding dampens the sound emitted by the speakers thereby affording protection for the child's hearing. The speakers are provided with hook and loop fasteners on the rear surfaces thereof (not shown) to enable the speakers to be easily removed for repair, cleaning and the like. Each speaker is provided with conventional jacks and wires adapted to be connected to an audio component.

Figure 2:
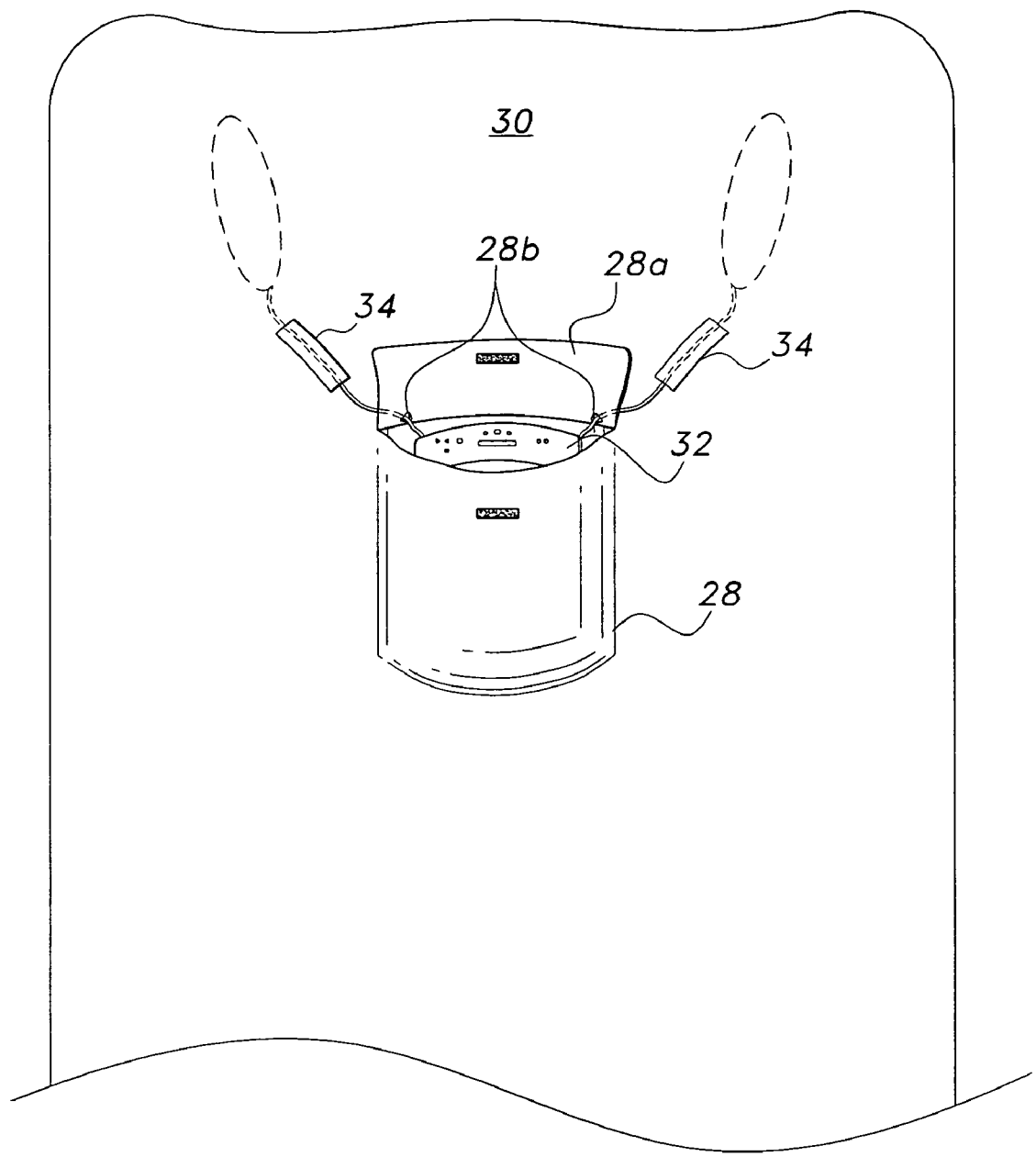
FIG. 2 is a partial rear view of a stroller with a CD player according to the present invention.

A water-resistant pocket 28 is disposed on the rear wall 30 of the stroller (FIG. 2). Pocket 28 is at least large enough to house an audio component 32 such as a CD player. Although a CD player is preferred, it is obvious that other types of audio components (tape player, mini disc player, radio, etc.) could be utilized if desired. Pocket 28 is provided with a flap 28a having hook and loop fasteners for securely closing the pocket if necessary. A pair of openings 28b is provided in the flap for the insertion of speaker wires there through. Covers 34 having hook and loop fasteners thereon are provided to secure the speaker wires to the rear wall 30.

It is to be understood that the present invention is not limited to the embodiment described above, but encompasses any and all embodiments within the scope of the following claims.

I claim:

1. A child's entertainment system comprising:
   a stroller, said stroller having a back wall, a pair of side wall areas and a rear wall;
   a pair of audio speakers, each of said speakers disposed in a respective side wall;
   a perforate heavy padding, said perforate heavy padding fabricated from a durable, soft, rain-resistant, supple material and enclosing each of said pair of audio speakers;
   a pocket positioned on said rear wall, said pocket having an opening;
   an audio component disposed in said pocket, said audio component having speaker wires;
   a flap for closing said opening in said pocket, wherein hook and loop fasteners are disposed on said flap and said pocket for securing said flap in a closed position;
   openings disposed in said flap for receiving said speaker wires;
   cover members for securing said speaker wires to said rear wall; and
   a CD holder removably secured to at least one of said pair of side walls.

2. A child's entertainment system as recited in claim 1, including hook and loop fasteners disposed on said cover members for securing said speaker wires to said rear wall.

3. A child's entertainment system as recited in claim 1, wherein said pocket is fabricated from rain-resistant material.

* * * * *